United States Patent Office 3,268,409
Patented August 23, 1966

3,268,409
TREATMENT OF HEPATIC DEGENERATION
Gerard Nomine, Noisy-le-Sec, Lucien Penasse, Paris, and Pierre Barthelemy, Clichy-sous-Bois, France, assignors to Roussel-UCLAF, S.A., Paris, France, a corporation of France
No Drawing. Filed Apr. 2, 1963, Ser. No. 269,870
Claims priority, application France, Apr. 10, 1962, 893,974
3 Claims. (Cl. 167—73)

The invention relates to novel stable, solid compositions for the treatment of hepatic degeneration which are diluted before administration. The invention also relates to a novel method of treating hepatic degeneration.

Dimethyl benzimidazol cobamide adenosine coenzyme or "co-factor form of vitamin $B_{12}$" is known to be a factor in the incorporation of amino acids in animal or bacterial protein. Mehta et al. (Biophysica, Biochimica Acta, vol. 35, 1959, p. 286) have shown that the said coenzyme integrally restored the faculty of incorporation of amino acids in proteins of microsomia of deficient rat livers and that vitamin $B_{12}$ was less active for this purpose. Barker et al. (Proceed. Natl. Acad. Sci. U.S., vol. 44, 1958, p. 1093) have shown that a co-factor of the pseudo-vitamin $B_{12}$ or its analogs intervenes in the transformation of glutamic acid into β-methyl aspartic acid in the cells of Clostridium tetanomorphum. However, dimethyl benzimidazol cobamide adenosine coenzyme has never been used for any therapeutic purposes.

It is an object of the invention to provide novel stable compositions for the treatment of hepatic degeneration.

It is another object of the invention to provide a novel method for the treatment of hepatic degeneration.

These and other objects and advantages of the invention will become obvious from the following detailed description.

The novel stable compositions of the invention for the treatment of hepatic degeneration are comprised of a compound selected from the group consisting of dimethyl benzimidazol cobamide adenosine coenzyme and its pharmaceutically acceptable acid addition salts and a solid, water-soluble pharmaceutical carrier. The said coenzyme undergoes very rapid decomposition in solution when exposed to white light and very easily loses its activity. The solid compositions of the invention are quite stable and may be stored for long periods of time as long as they are not exposed to white light. The said compositions can be easily diluted to the desired concentration just before use and very little decomposition will take place during the short period between dissolution and transcutaneous administration.

Examples of suitable acids which may be used to form the pharmaceutically acceptable acid addition salts of dimethyl benzimidazol cobamide adenosine coenzyme are mineral acids such as hydrochloric acid, sulfuric acid, etc. and organic acids such as citric acid, tartaric acid, etc.

Dimethyl benzimidazol cobamide adenosine coenzyme possesses therapeutic properties superior to those of cyanocobalamine (vitamin $B_{12}$) and exercises a protective or curative effect with reference to chemical, toxic, bacterial or surgical attack of the liver. It actively participates in the rapid regeneration of the liver in cases of steatosis, of cirrhosis, of intoxication by solvents such as chlorinated solvents or alcohol, in the hemolytic icterus and is useful for suppressing manifestations of senescence due to an alteration of the albumin/globulin ratio of the blood. The amount of blood proteins, and particularly of albumins, tends to be lowered with age causing an increase of cholesterolemia and of lipemia. The administration of dimethyl benzimidazol cobamide adenosine coenzyme contributes to raising the amount of blood albumins by accelerating their synthesis by the liver. Whereby, it can prevent or lower the elevation of cholesterolemia and plays a favorable role in the prevention of atheromatosis. Also the said coenzyme exercises a favorable effect on the weight gaining of young patients.

The novel method of the invention for treating hepatic degeneration comprises administering daily an effective amount of dimethyl benzimidazol cobamide adenosine coenzyme. The usual single dose is 1 to 5 mg. and the usual daily dose is 1 to 25 mg. in the adult depending upon the method of administration. The said coenzyme is administered transcutaneously.

Dimethyl benzimidazol cobamide adenosine coenzyme may be recovered in its pure state from culture broths as described in the commonly assigned, copending application Serial No. 252,667, filed January 21, 1963, now Patent No. 3,132,135, by adding to an aqueous solution having a minimum concentration of 0.05% of dimethyl benzimidazol cobamide adenosine coenzyme an amount of a phenolic compound such as phenol less than its solubility in water to form a hydrated crystalline complex of dimethyl benzimidazol cobamide adenosine coenzyme-phenolic compound, redissolving the crystalline complex in an aqueous solvent, such as an acetone-water solvent, adding a water-miscible solvent, such as acetone to the solution to precipitate the said coenzyme in its pure form.

Examples of suitable solid water-soluble pharmaceutical carriers which may be used to form the compositions of the invention are mannitol, sorbitol, lactose, etc.

In the following examples there are described several preferred embodiments to illustrate the invention. However, it should be understood that the invention is not intended to be limited to the specific embodiments.

EXAMPLE I.—PREPARATION OF PHARMACEUTICAL COMPOSITIONS OF DIMETHYL BENZIMIDAZOL COBAMIDE ADENOSINE COENZYME

Dimethyl benzimidazol cobamide adenosine coenzyme, prepared according to copending application Serial No. 252,667, filed January 21, 1963, was dissolved in water and the resulting solution was sterilized by aseptic filtration through appropriate membranes. The sterile solution was then added to acetone and dimethyl benzimidazol cobamide adenosine coenzyme precipitated. The precipitate was vacuum filtered and dried in the absence of microbiological contaminations and of all light except red light.

Mannitol was dissolved in sufficient sterile distilled water to obtain a 30% solution of mannitol and the resulting solution was added to three volumes of acetone which provoked a precipitation of mannitol. Another three volumes of acetone was then added to complete the precipitation and the precipitate was separated by filtration, vacuum filtered and dried at room temperature under vacuum to obtain a sterile powder of mannitol free from foreign bodies.

The dry mannitol was mixed with the dimethyl benzimidazol cobamide adenosine coenzyme in adequate proportions so that 100 mg. of the mixture contained 1 to 5 mg. of the said coenzyme. The powdered mixture was then divided aseptically into sterile flacons which were then sealed and wrapped with an aluminum foil. The sealed flacon may be protected from light with other opaque or colored coatings, such as varnish or tinted plastic. In this manner, the said coenzyme is protected from photolysis due to the action of light from the moment of its preparation until the short lapse of time occurring between placing it in solution and its administration. The syringe should also be protected from light as much as possible. The mobile characteristic of the flacon, assures complete dissolution of the said coenzyme without decomposition and facilitates its transfer into a syringe.

EXAMPLE II

Another way to prepare a soluble powder comprises dissolving dimethyl benzimidazol cobamide adenosine coenzyme in water in the absence of light. To the resulting solution, an adjuvant agent, such as mannitol, sorbitol or lactose was added and the solution was brought to the desired volume. The solution was then filtered aseptically and then aseptically added to flacons which had been sterilized by heating. The flacons were then dehydrated by lyophilization in the absence of light and were sealed and packaged.

PHARMALOGICAL DATA

A. *Protein synthesis study*

(1) *Regeneration of the liver in rats.*—The rats used in this test had been subjected to a partial hepatectomy while under anesthesia with ether by removal of the left lobe and squared lobe of the liver which is an average of 40% of the total liver. The separated fragments of the liver were washed in heparinated physiological serum and weighed. The rats received an injection of an antibiotic for four days after the operation.

In the test, three lots each of ten male rats having an average weight of 300 gm. were used as a control, for treatment with vitamin $B_{12}$ and for treatment with dimethyl benzimidazol cobamide adenosine coenzyme. Beginning 48 hours after the partial hepatectomy and continuing for 24 days, the treated rats received subcutaneously under red light every two days 200 $\gamma$/kg. of vitamin $B_{12}$ or 250 $\gamma$/kg. of dimethyl benzimidazol cobamide adenosine coenzyme in equimolecular doses in a volume of 0.2 cc. per 100 gm. of body weight while the control rats received injections of physiological serum. The rats were weighed every two days and there was no significant difference in the weight curves of the three groups. One rat of the control group died on the 19th day and on the 26th day after the hepatectomy all of the surviving animals were sacrificed.

To determine the evolution of proteinemia, blood samples were taken from the ophthalmic plexus of the rats on the 10th and 18th days as well as during the sacrifice on the 26th day. The amount of albumins and seric globulins was determined on the various blood samples and the average results are summarized in Table I. The values in the parentheses are the percent of change with reference to the values of the 10th day.

TABLE I

| Treatment | 10th Day | 18th Day | 26th Day |
|---|---|---|---|
| Total seric proteins, parts per thousand: | | | |
| Controls | 79.74 | 84.50 (+6%) | 72.70 (−6%). |
| Vitamin $B_{12}$ | 75.87 | 84.06 (+11%) | 86.00 (+13%). |
| Dimethyl benzimidazol cobamide adenosine coenzyme. | 75.12 | 87.10 (+16%) | 87.10 (+16%). |
| Seric albumins, parts per thousand: | | | |
| Controls | 31.86 | 31.20 (−2%) | 26.08 (−19%). |
| Vitamin $B_{12}$ | 31.32 | 31.40 (0) | 31.82 (+1%). |
| Dimethyl benzimidazol cobamide adenosine coenzyme. | 31.73 | 34.22 (+8%) | 36.00 (+13%). |
| Seric globulins, parts per thousand: | | | |
| Controls | 47.88 | 53.30 (+11%) | 46.62 (−3%). |
| Vitamin $B_{12}$ | 44.55 | 52.70 (+18%) | 54.17 (+21%). |
| Dimethyl benzimidazol cobamide adenosine coenzyme. | 43.39 | 52.90 (+21%) | 51.13 (+18%). |

From these results it can be seen that the total protides of the animals treated either with dimethyl benzimidazol cobamide adenosine coenzyme or with vitamin $B_{12}$ attain a maximum on the 18th day. Then they remain in a plateau contrarily to the controls whose total protides after having attained the same value diminish from the 18th to the 26th day. In addition, while the albuminemia decreases in the control and only maintains itself to the value of the 10th day in the animals treated with vitamin $B_{12}$, it increases regularly in those treated with dimethyl benzimidazol cobamide adenosine coenzyme.

On the samples of blood taken during the sacrifice as well as on the samples of blood of the normal controls of the same weight and of the same age, the value of total lipides and of total cholesterol in the blood was determined to test for lipemia and cholesterolemia. Table II summarizes the average results.

TABLE II

| Determinations | Normal controls | Partially hepatectomized controls | Animals treated with vitamin $B_{12}$ | Animals treated with dimethyl benzimidazol cobamide adenosine coenzyme |
|---|---|---|---|---|
| Total lipides in gram parts per thousand | 4.73 | 3.65 | 3.84 | 3.97 |
| Total cholesterol in gram parts per thousand | 0.73 | 0.52 | 0.65 | 0.69 |

It can be seen that among the rats treated with dimethyl benzimidazol cobamide adenosine coenzyme, lipemia and cholesterolemia occurred which approached most nearly those of the controls not hepatectomized.

The livers of the animals were separated after sacrifice and weighed. Then on an average sample of the livers of each group of rats, the dry extract and the amount of total proteins and total lipides was determined. The results obtained are summarized in Table III.

TABLE III

| Determinations | Normal controls | Hepatectomized controls | Animals treated with vitamin $B_{12}$ | Animals treated with dimethyl benzimidazol cobamide adenosine coenzyme |
|---|---|---|---|---|
| Weight of liver in gm. per 100 gm. of body weight | 3.93 | 3.75 | 3.26 | 3.19 |
| Dry extract in gm. per 100 gm. of fresh liver | 29.5 | 27.4 | 29.7 | 32 |
| Proteins in gm. per 100 gm. of fresh liver | 20.62 | 21.34 | 22.87 | 23.97 |
| Lipides in gm. per 100 gm. of fresh liver | 4.35 | 4.27 | 5.05 | 5.03 |

It can be noted that while the weight of liver converted to 100 gm. of body weight is a little more weak in treated animals, the dry extract is more elevated in particular in those treated with dimethyl benzimidazol cobamide adenosine coenzyme and the value in proteins is also more elevated.

(2) *Non-hepatectomized aged animals.*—Three groups of ten healthy female rats, 23 months old and having an average weight of 320 gm., were used for this test. Individual determinations of seric albumin and seric globulins were made on blood taken from the ophthalmic plexus of the rats just before the first injection and on the 8th, 15th, 22nd and 36th days of the test. Every two days for a period of 34 days, one group of rats serving as the control received a dose of physiological serum, the second group received 200 $\gamma$/kg. of vitamin $B_{12}$ and the third group received 250 $\gamma$/kg. of dimethyl benzimidazol cobamide adenosine coenzyme subcutaneously. On the 36th day the rats were sacrificed and their kidneys and livers were removed and weighed. The results are summarized in Table IV.

TABLE IV.—LEVELS OF SERIC PROTIEN

| | Before injection | 8th Day | 15th Day | 22nd Day | 36th Day |
|---|---|---|---|---|---|
| Proteinemia in gm. parts per thousand: | | | | | |
| Controls | 84.80 | 85.47 (+1%) | 85.28 (+0.5%) | 83.02 (−2%) | 77.51 (−9.5%). |
| Treated with vitamin $B_{12}$ | 87.20 | 83.18 (−5%) | 80.68 (−7.5%) | 85.95 (−1.5%) | 80.75 (−7.5%). |
| Treated with dimethyl benzimidazol cobamide adenosine coenzyme | 85.83 | 87.90 (+2.5%) | 86.95 (+1.5%) | 94.47 (+10%) | 84.80 (−1%). |
| Albuminemia in gm. parts per thousand: | | | | | |
| Controls | 39.12 | 35.81 (−8.5%) | 35.49 (−9.5%) | 36.07 (−8%) | 31.06 (−21%). |
| Treated with vitamin $B_{12}$ | 39.04 | 34.97 (−10.5%) | 30.55 (−22%) | 36.01 (−8%) | 33.19 (−15%). |
| Treated with dimethyl benzimidazol cobamide adenosine coenzyme | 39.38 | 39.49 (0) | 37.17 (−5.5%) | 41.83 (+6%) | 37.91 (−3.5%). |
| Globulinemia in gm. parts per thousand: | | | | | |
| Controls | 45.68 | 49.56 (+8.5%) | 49.79 (+9%) | 46.95 (+3%) | 46.45 (+1.5%). |
| Treated with vitamin $B_{12}$ | 48.16 | 48.21 (0) | 50.13 (+5%) | 49.94 (+3.5%) | 47.57 (−1.5%). |
| Treated with dimethyl benzimidazol cobamide adenosine coenzyme | 46.43 | 48.41 (+4%) | 49.78 (+7%) | 52.64 (+11%) | 46.89 (+1%). |
| Ratio of albumins-globulins: | | | | | |
| Controls | 0.86 | 0.72 | 0.71 | 0.76 | 0.68. |
| Treated with vitamin $B_{12}$ | 0.83 | 0.72 | 0.62 | 0.73 | 0.71. |
| Treated with dimethyl benzimidazol cobamide adenosine coenzyme | 0.87 | 0.81 | 0.76 | 0.82 | 0.83. |

Figures in parentheses indicate variation percentage with reference to the first determination.

The weight of the rats remained the same throughout the test and one rat treated with vitamin $B_{12}$ died the 23rd day. A certain aging of the rats was noted during the test and the degree of aging was indicated by (+). The maximum degree (3+) corresponded to the almost complete disappearance of the abdominal hair and of hair on the muzzle with the adhering coat generally in a mediocre state. The results are summarized in Table V.

The degree of aging is determined by the sum of the crosses (+) noted in Table V for the whole of the animals of each lot.

From both Table IV and Table V it appears that dimethylbenzimidazol cobamide adenosine coenzyme has proved to be most efficient at stabilizing the blood proteins and particularly the albumins which are known to be synthetized by the liver, whereas vitamin $B_{12}$ seems to be ineffective under the experimental conditions and dosages tried.

Dimethylbenzimidazol cobamide adenosine coenzyme, in particular, seems to be endowed with a distinct action upon aging and obvious effects upon the kidneys and the liver.

TABLE V.—EFFECT ON THE APPARENT AGING AND WEIGHT OF THE ORGANS

| | Control lot | Lot treated with vitamin $B_{12}$ | Lot treated with dimethyl benzimidazol cobamide adenosine coenzyme |
|---|---|---|---|
| Degree of aging | 9+ | 5+ | 2+ |
| Weight of liver in gm. per 100 gm. of body weight | 3.71 | 3.55 | 4.04 |
| Weight of kidneys in gm. per 100 gm. of body weight | 0.74 | 0.69 | 0.77 |

(3) *Antitoxic action with reference to hepatic intoxications.*—A hepatic intoxication was effected by administering to young rats having an average weight of 100 gm. as a drinking water, water containing 5% of absolute ethyl alcohol. The rats also received each day per os 0.2 cc. of a solution containing 20% of carbon tetrachloride in peanut oil.

Three groups of ten rats, a control group, a group treated with vitamin $B_{12}$ (200 γ/kg. every two days) and a group treated with dimethyl benzimidazol cobamide adenosine coenzyme (250 γ/kg. every two days) were subjected to this routine for a period of 15 days. The administration of carbon tetrachloride was suspended on the 15th day in order to retard the mortality which became quite great. There was noted then a very significant improvement of growth only in the group of rats treated with dimethyl benzimidazol cobamide adenosine coenzyme and this despite the maintenance of alcohol in the drinking water.

The animals were sacrificed on the 22nd day and their blood was taken in order to determine the level of the blood proteins. The animals surviving to the end of the experiment were six of the control lot, four of the lot treated with vitamin $B_{12}$, and five of the lot treated with dimethyl benzimidazol cobamide adenosine coenzyme. The results are summarized in Table VI.

TABLE VI

| Determinations | Control lot | Lot treated with vitamin $B_{12}$ | Lot treated with dimethyl benzimidazol cobamide adenosine coenzyme |
|---|---|---|---|
| Weight at the start of the test, gm | 100 | 100 | 100 |
| Weight at the finish of the test, gm | 115 | 116 | 133 |
| Total seric protides in gm. parts per thousand, gm | 68.7 | 62.9 | 69.2 |
| Seric albumin in mg. parts per thousand, gm | 26 | 26.9 | 30.4 |
| Seric globulins in gm. parts per thousand, gm | 42.7 | 36.0 | 38.8 |
| Ratio, Albumin/Globulin, gm | 0.60 | 0.73 | 0.80 |

The dimethyl benzimidazol cobamide adenosine coenzyme thus protects the animals against the decrease of proteic anabolism at the level of the liver provoked by the association of carbon tetrachloride with alcohol.

B. *Determination of toxicity*

(1) *Acute toxicity.*—Dimethyl benzimidazol cobamide adenosine coenzyme placed in solution in physiological serum at a concentration of 5 mg./cc. was injected subcutaneously at a dose of 50 mg./kg. to a lot of ten mice of the Rockland strain weighing from 18 to 22 gm. The solutions were prepared extemporaneously in the absence of light and the injection was made in red light. The animals were maintained under observation for a period of seven days. No mortality nor symptoms of intoxication were noted. In addition, doses of 150 and 250 mg./kg. injected intravenously were perfectly tolerated. Dimethyl benzimidazol cobamide adenosine coenzyme manifests no toxicity even at these very elevated doses.

(2) *Chronic toxicity.*—Dimethyl benzimidazol cobamide adenosine coenzyme was administered subcutaneously to a lot of ten male rats weighing about 135 gm. for a period of four weeks, with the exception of Sundays, being a total of 25 injections, at a dose of 2 mg./kg. (volume administered: 0.2 cc.) being made in red light. A group of ten control rats received a daily subcutaneous injection of 0.2 cc. of physiological serum. No mortality was observed in the two groups of rats and all the rats were in a good general state of health. The rats of each group followed a normal growth rate during the test and the weight-curve followed a practically identical evolution. Table VII shows the average weights at the beginning and the end of the test.

TABLE VII

| Lot of Animals | Average Weight in Grams | |
| --- | --- | --- |
| | At the 1st Day | At the 28th Day |
| Controls | 135 | 255±2 |
| Treated | 137 | 242±4 |

The difference in weight observed between the two lots does not appear significant. The animals were then sacrificed and autopsied. No anatomical or histological lesions were detected, neither to the macroscopic examination nor to the microscopic examination. Dimethyl benzimidazol cobamide adenosine coenzyme is thus perfectly tolerated in rats in prolonged administration at a dose of 2 mg./kg.

Various modifications of the compositions of the invention may be made without departing from the spirit or scope thereof, and it is to be understood that the invention is intended to be limited only as defined in the appended claims.

We claim:
1. A method of treating hepatic degeneration which comprises administering transcutaneously daily to animals an effective amount of a compound selected from the group consisting of dimethyl benzimidazol cobamide adenosine coenzyme and its pharmaceutically acceptable acid addition salts.
2. A method of treating hepatic degeneration which comprises administering transcutaneously daily to animals an effective amount of dimethyl benzimidazol cobamide adenosine coenzyme.
3. A method of treating hepatic degeneration which comprises administering transcutaneously daily to animals 1 to 25 mgm. of dimethyl benzimidazol cobamide adenosine coenzyme.

References Cited by the Examiner

Barker: J. of Biological Chemistry, vol. 235, January 1960, pages 181, 182, 187 and 188.

Barker: J. of Biological Chemistry, vol. 235, February 1960, pages 480, 481, 486 and 487.

JULIAN S. LEVITT, *Primary Examiner.*

SAM ROSEN, *Assistant Examiner.*